May 19, 1970  A. E. CARLILE  3,512,226

PLASTIC HOOK AND EYE

Filed March 12, 1968

INVENTOR.
ALFRED E. CARLILE
BY Meech & Field
ATTORNEYS.

United States Patent Office 3,512,226
Patented May 19, 1970

3,512,226
PLASTIC HOOK AND EYE
Alfred E. Carlile, Meadville, Pa., assignor, by mesne assignments, to Textron Inc., Providence, R.I., a corporation of Delaware
Filed Mar. 12, 1968, Ser. No. 712,412
Int. Cl. A44b 17/00
U.S. Cl. 24—224
4 Claims

ABSTRACT OF THE DISCLOSURE

A fastening device made of a pliable plastic material including an eye member adapted to be attached to a portion of an article and a hook member adapted to be attached to another portion of an article for securing the article portions together, the hook member having a substantially resilient C-shaped hollow head portion which is adapted to receive the stud-like head portion of the eye member and a laterally directed opening in the C-shaped head portion communicating with the hollow portion having sufficient size to receive the stud-like head portion of the eye member upon lateral movement of the two members relative to one another to move the two members into and out of interlocking engagement.

---

This invention relates to a fastening device, and more particularly to such a device of the so-called hook and eye type especially adaptable for articles such as waistbands of trousers, skirts and other garments or articles to detachably secure together two parts or portions.

This invention relates to the type of fastening devices disclosed in the U.S. patent to Littell et al., No. 3,313,008 issued Apr. 11, 1967, entitled "Trouser Hook and Eye," and is designed to provide an improved fastening device of this type molded from a pliable plastic material which can be adapted for many uses other than with garments and the like.

It is the general object of the present invention to provide a new and improved fastening device of the type described made of a pliable plastic material which is not only strong and durable in its construction but at the same time a fastening device which can easily be manipulated for detachably securing two parts or portions together.

It is another object of the invention to provide an improved fastening device of this type which is simple and economical in its construction and manufacture and, at the same time, efficient and effective in its use.

It is a further object of this invention to provide an improved fastening device of the hook and eye type which may be manipulated for detachably securing two parts together by a single straight line lateral motion of the two members relative to one another in parallel planes parallel to the planes of the overlapped parts or portions with which it is adapted to be used.

It is a more specific object of the invention to provide a fastening device of the type described wherein there is provided a stud-like head portion on the eye member which is adapted to be inserted laterally into and through an opening in a resilient substantially C-shaped socket portion of the hook member by a snapping action so as to interlock securely together the two parts or portions to which the respective members are attached.

Various other objects and advantages of this invention will be more apparent in the course of the following specification, and will be particularly pointed out in the appended claims.

In the accompanying drawings, there is shown for the purpose of illustration, an embodiment and a modification thereof which the invention may assume in practice.

Figure 1:
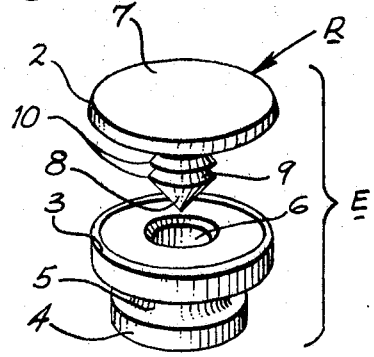
Figure 2:
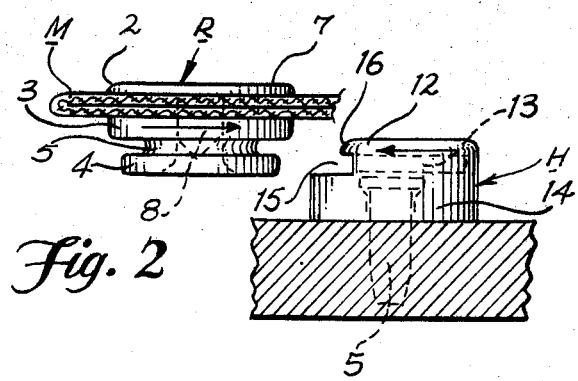
Figure 3:
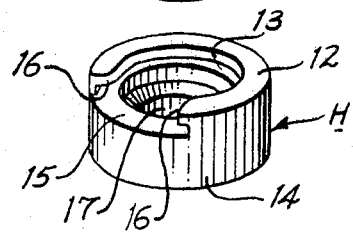
Figure 3:
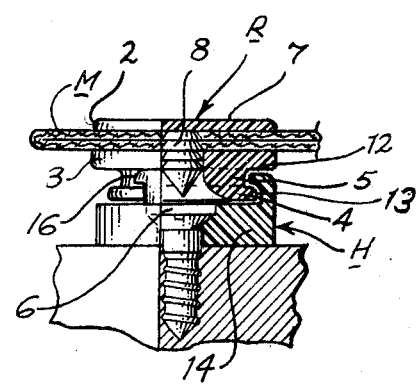
Figure 4:
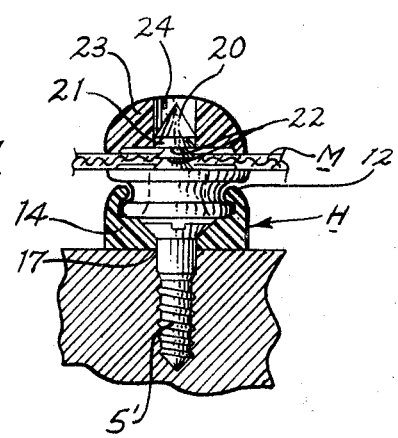

FIG. 1 is an exploded perspective view showing the several parts of the fastening device in accordance with the present invention, FIG. 2 is a side elevational view, partly in section, showing the stud-like portion of the eye member about to engage the socket portion of hook member and showing the respective members attached to the respective overlapping portions or parts of articles with which they are adapted to be used, FIG. 3 is a side elevational view, partly in section, showing the fastener members fully inter-engaged, and FIG. 4 is a vertical sectional view of a modified construction of a hook and eye type fastener in accordance with the present invention.

Referring more particularly to the drawings, the improved hook and eye fastening device in accordance with the present invention consists of an eye or stud-like member E and a hook or socket member H which are adapted to be interengaged.

In this improved construction in the preferred embodiment, as shown in FIGS. 1 through 3 of the drawings, the eye or stud-like member E consists of a cylindrical member having a circular flange or annular portion 3 at one end thereof and a smaller circular or annular portion 4 arranged on the opposite end thereof which are integrally connected by a hub or shank portion 5 whereby these two cylindrical portions are spaced from one another. Centrally of these two cylindrical portions and concentric therewith, there is provided an aperture or bore 6 therethrough.

There is provided a rivet-like member R having a head portion 7 and a shank portion 8 which cooperates with the cylindrical member 2 for attaching the parts, in cooperation with one another, to the portions or parts of articles to be attached together in a manner hereafter to be described. On the shank 8, there is arranged a series of annular grooves 9 so as to provide sharp edges 10.

In attaching the eye member E to a part or portion of an article made of a flexible material, as shown, the cylindrical member 2 is placed in the desired portion with the cylindrical flange portion 3 bearing against the surface of the material. The shank portion 8 of the rivet-like member R is then forced into the material M so that the shank portion passes through the material and into the aperture 6 in the cylindrical member far enough so that the material is tightly gripped or clamped between the flange 3 and the rivet head 7. It will be understood that the sharp annular edges 10 on the shank portion 8 bite into the inner wall of the aperture 6 to hold the members securely together, as shown in FIG. 2 of the drawings.

The hook or socket member H consists of a cylindrical body member 14 having a substantially C-shaped flange portion 12 arranged at one end thereof so as to provide a space 13 between the same and the body portion of this member. In providing such a construction it will be seen that there is provided an opening 15 at one side of the body portion which communicates with space 13 under flange 12. It will be understood that the distance between the opposed arcuated edges 16 of the flanges 12 at this opening 15 is slightly less than the diameter of hub portion 5 of the eye member E for a reason presently to be described. Centrally of the body portion 14 there is arranged therethrough preferably a counterbored aperture 17.

As shown, this eye or socket member E is attached to a solid surface such as wood or metal with which it is adapted to be used preferably by means of a rivet or screw S which is disposed in the aperture 17, as shown in FIG. 2 of the drawings.

It will be seen that the two members are inter-engaged by moving the eye member E laterally relative to the hook member H toward and into the opening 15 in the side thereof, as shown in FIG. 2 of the drawings. As the eye member moves into this opening the hub portion 5 of this member contacts the opposed arcuated edges or corners 16 of the flange 12. Upon further movement of the eye member this hub portion will tend to force or spring apart the edges or corners 16 permitting the flange 4 of the eye member to pass into the space 13 under the flange 12 until it is fully seated therein, as shown in FIG. 3, and the members fully inter-engaged. To disengage the members, the reverse procedure is followed.

In the modification, shown in FIG. 4 of the drawings, there is carried by the eye member E, a stud or shank portion 20 having annular grooves 21 arranged around the periphery thereof so as to provide sharp edges 22 similar to the rivet R in the preferred embodiment. There is provided a button-like member 23 having an aperture 24 arranged centrally therein for receiving the stud or shank portion 20. As before, this shank portion penetrates the material M and the sharp edges 22 bite into the wall of the aperture 24 in the button-like member 23 to attach the eye member securely to the flexible material. It will be seen that the hook member H is of the same construction as in the preferred embodiment and attached to a solid surface in a like manner with the same function.

It will be understood that both the eye and hook members are preferably molded from a suitable thermoplastic material having resilient characteristics. While the subject fastening device may be used with garments and articles of apparel it is especially adaptable for flexible covers adapted to be attached to a rigid supporting surface such as used for boat and hatch covers, tarpaulins and the like.

As a result of my invention, it will be seen that there is provided an improved fastening device of this type which can be conveniently and inexpensively molded and attached to the respective parts adapted to be secured together.

While there is shown and described an embodiment and a modification thereof which the invention may assume in practice, it will be understood that these embodiments are merely for the purpose of illustration and description, and that other forms can be devised.

I claim:

1. In a fasteneing device of the hook and eye type made of a moldable plastic material, the combination of:
   an eye member consisting of a body member having an annular flange portion arranged at one end thereof,
   said body member having an aperture arranged therethrough centrally thereof,
   a rivet-like member having a head portion and a shank portion, said shank portion having a series of grooves arranged around the periphery thereof so as to provide a series of sharp edges,
   the shank portion of the rivet adapted to penetrate the material with which the fastener is to be used and forcibly positioned in the aperture of said body member whereby the sharp edges bite into the wall of said aperture to attach securely the eye member to the material by a gripping action, and
   a hook member consisting of a body member having a substantially C-shaped flange portion carried thereby so as to provide a space thereunder and a lateral opening at one side thereof communicating with said space for receiving the flange portion of said eye member when the eye and hook members are adapted to be inter-engaged,
   the distance between the opposed edges of said opening being slightly less than the width of said flange portion whereby the opposed edges are adapted to be sprung apart when the members are moved to inter-engaged or disengaged position with the flange portion of said eye member adapted to be disposed in the space under the flange of said hook member when the members are inter-engaged so as to hold them securely together,
   said hook member having an aperture arranged therethrough centrally thereof for receiving a member for attaching the hook member to a supporting surface.

2. In a fastening device of the hook and eye type made of a moldable plastic material, the combination of:
   an eye member consisting of a cylindrical member having an annular flange portion arranged at one end thereof and a smaller annular flange portion arranged at the opposite end thereof,
   said flange portions being integrally connected by a hub portion so as to provide an annular space therebetween,
   said cylindrical member having an aperture arranged therethrough centrally thereof,
   a rivet-like member having a head portion and a shank portion, said shank portion having a series of grooves arranged around the periphery thereof so as to provide a series of sharp edges,
   the shank portion of the rivet adapted to penetrate the material with which the fastener is to be used and forcibly positioned in the aperture of said cylindrical member whereby the sharp edges bite into the wall of said aperture to attach securely the eye member to the material by a gripping action, and
   a hook member consisting of a cylindrical body member having a substantially C-shaped flange portion arranged at one end thereof so as to provide a space thereunder and a lateral opening at one side thereof communicating with said space for receiving the hub portion of said eye member when the eye and hook members are adapted to be inter-engaged,
   the distance between the opposed edges of said opening being slightly less than the diameter of said hub portion whereby the opposed edges are adapted to be sprung apart when the members are moved to inter-engaged or disengaged position with the smaller flange portion of said eye member adapted to be disposed in the space under the flange of said hook member when the members are inter-engaged so as hold them securely together,
   said body member having an aperture arranged therethrough centrally thereof for receiving a member for attaching the hook member to a supporting surface.

3. In a fastening device of the hook and eye type made of a moldable plastic material, the combination of:
   an eye member consisting of a cylindrical member having an annular flange portion arranged at one end thereof and a smaller annular flange portion arranged at the opposite end thereof,
   said flange portions being integrally connected by a hub portion so as to provide an annular space therebetween,
   a button-like member having an aperture arranged therethrough centrally thereof,
   a shank portion extending outwardly from said cylindrical member having a series of grooves arranged around the periphery thereof so as to provide a series of sharp edges,
   said shank portion adapted to penetrate the material with which the fastener is to be used and forcibly positioned in the aperture of said button-like member whereby the sharp edges bite into the wall of said aperture to attach securely the eye member to the material by a gripping action, and
   a hook member consisting of a cylindrical body member having a substantially C-shaped flange portion arranged at one end thereof so as to provide a space thereunder and a lateral opening at one side thereof communicating with said space for receiving the hub portion of said eye member when the eye and hook members are adapted to be inter-engaged, the distance between the opposed edges of said opening being slightly less than the diameter of said hub portion whereby the opposed edges are adapted to be sprung apart when the members are moved to inter-engaged or disengaged position with the smaller flange portion of said eye member adapted to be disposed in the space under the flange of said hook member when the members are inter-engaged so as to hold them securely together, said body member having an aperture arranged therethrough centrally thereof for receiving a member for attaching the hook member to a supporting surface.

4. In a fastening device of the hook and eye type made of a pliable plastic material, the combination of:

a circular shaped eye member having a circular base portion and a circular flange head portion arranged on one side thereof and spaced therefrom by an integral connecting neck portion, a cylindrical shank portion arranged on the opposite side of said base portion terminating in a pointed end, said shank portion being corrugated so as to provide a plurality of spaced-apart grooves arranged around the periphery thereof and a plurality of spaced-apart sharp annular edge portions, an annular head member having a bore arranged therein which has a diameter slightly less than the outer diameter of the shank portion at said annular sharp edges with which it is adapted to cooperate to hold the two members securely in engagement with one another by which the eye member may be attached to a supporting material, a circular hook member with which said eye member is adapted to inter-engage having a circular base portion with a bore arranged therein, said base portion having a substantially C-shaped flange portion arranged integral therewith and spaced therefrom having a lateral opening in one side thereof and including an outer face wall and an inwardly extending side flanged wall disposed about a C-shaped hollow opening with said outer face wall having opposed arcuated edge portions at said lateral opening, the diameter of the C-shaped opening bounded by the innermost edge of said outer face wall being slightly greater than that of the circular flange heel portion of said eye member and with the distance between said arcuated edge portions thereof being slightly less than the diameter of the neck portion of said eye member, said eye member adapted to spread the opposed arcuated edge portions of said outer face wall and pass through said lateral opening into the C-shaped opening with said outer face wall overlying said flanged portion of said eye member and with the portions of said inwardly extending side flanged wall carrying said outer face wall located adjacent to said lateral opening being resiliently deformed upon passage of said eye member, means for attaching the hook member to a supporting member.

References Cited

UNITED STATES PATENTS

| 776,838 | 12/1904 | Higgin | 24—222 |
| 1,170,346 | 2/1916 | Sato et al. | 24—222 |
| 1,228,181 | 5/1917 | Cody | 24—222 |
| 3,313,008 | 4/1967 | Littell et al. | 24—224 |

FOREIGN PATENTS

| 429,391 | 7/1911 | France. |

DONALD A. GRIFFIN, Primary Examiner